(12) United States Patent
Edgar

(10) Patent No.: US 7,020,344 B2
(45) Date of Patent: Mar. 28, 2006

(54) MATCH BLUR SYSTEM AND METHOD

(75) Inventor: Albert D. Edgar, Austin, TX (US)

(73) Assignee: Eastman Kodak Company, Rochester, NY (US)

( * ) Notice: Subject to any disclaimer, the term of this patent is extended or adjusted under 35 U.S.C. 154(b) by 567 days.

(21) Appl. No.: 09/775,688

(22) Filed: Feb. 2, 2001

(65) Prior Publication Data

US 2001/0043755 A1    Nov. 22, 2001

Related U.S. Application Data

(60) Provisional application No. 60/180,036, filed on Feb. 3, 2000.

(51) Int. Cl.
*G06K 9/40*    (2006.01)

(52) U.S. Cl. ............... 382/264; 382/275; 358/3.26; 358/3.27

(58) Field of Classification Search ........... 382/264, 382/275; 358/3.26, 3.27
See application file for complete search history.

(56) References Cited

U.S. PATENT DOCUMENTS

| | | | |
|---|---|---|---|
| 2,404,138 A | 7/1946 | Mayer | 95/94 |
| 3,520,689 A | 7/1970 | Nagae et al. | 96/55 |
| 3,520,690 A | 7/1970 | Nagae et al. | 96/55 |
| 3,587,435 A | 6/1971 | Chioffe | 95/89 |
| 3,615,479 A | 10/1971 | Kohler et al. | 96/48 |
| 3,615,498 A | 10/1971 | Aral | 96/55 |
| 3,617,282 A | 11/1971 | Bard | 96/59 |
| 3,747,120 A | 7/1973 | Stemme | 346/75 |

(Continued)

FOREIGN PATENT DOCUMENTS

EP    0 261 782 A2    8/1987

(Continued)

OTHER PUBLICATIONS

Johannes Ristau and Wooil M. Moon. "Digital Filtering of 2-D Spatial Data Using Modified Local Statistics" Jun. 15, 1998.*

(Continued)

*Primary Examiner*—Joseph Mancuso
*Assistant Examiner*—Patrick L. Edwards
(74) *Attorney, Agent, or Firm*—Simon, Galasso & Frantz

(57) ABSTRACT

A method for blurring in signal processing, for example, in digital film processing, is performed with digital artifacts. The digital artifacts are derived, such as by scanning, and include a noisy artifact and a less noisy artifact. The artifacts are subdivided into a plurality of windows, with each window being subdivided into a plurality of squares. The squares of the noisy artifact and of the less noisy artifact have spatial correspondence, as do the respective windows. The method includes determining a difference between a square at a centrum of a window of the less noisy artifact and another square within the window of the less noisy artifact, weighting a value for the square based on the difference, summing all of the values for the square as so weighted, multiplying a value for the square of the window of the noisy artifact by the result of summing, summing all of the results of multiplying for each square of the window of the noisy artifact, and dividing the result of summing all of the results, by the result of summing all of the values for the square. The method can also include multiplying certain values by a percentage to limit over-expression of certain properties exhibited in certain of the artifacts, for example, magenta mottle.

3 Claims, 5 Drawing Sheets

U.S. PATENT DOCUMENTS

| | | | |
|---|---|---|---|
| 3,833,161 A | 9/1974 | Krumbein | 226/92 |
| 3,903,541 A | 9/1975 | Von Meister et al. | 354/317 |
| 3,946,398 A | 3/1976 | Kyser et al. | 346/1 |
| 3,959,048 A | 5/1976 | Stanfield et al. | 156/94 |
| 4,026,756 A | 5/1977 | Stanfield et al. | 156/554 |
| 4,081,577 A | 3/1978 | Horner | 427/424 |
| 4,142,107 A | 2/1979 | Hatzakis et al. | 250/571 |
| 4,215,927 A | 8/1980 | Grant et al. | 354/317 |
| 4,249,985 A | 2/1981 | Stanfield | 156/554 |
| 4,265,545 A | 5/1981 | Slaker | 356/431 |
| 4,301,469 A | 11/1981 | Modeen et al. | 358/75 |
| 4,490,729 A | 12/1984 | Clark et al. | 346/75 |
| 4,501,480 A | 2/1985 | Matsui et al. | 354/298 |
| 4,564,280 A | 1/1986 | Fukuda | 357/317 |
| 4,594,598 A | 6/1986 | Iwagami | 346/140 |
| 4,621,037 A | 11/1986 | Kanda et al. | 430/30 |
| 4,623,236 A | 11/1986 | Stella | 354/318 |
| 4,633,300 A | 12/1986 | Sakai | 358/41 |
| 4,636,808 A | 1/1987 | Herron | 346/75 |
| 4,666,307 A | 5/1987 | Matsumoto et al. | 356/404 |
| 4,670,779 A | 6/1987 | Nagano | 358/75 |
| 4,736,221 A | 4/1988 | Shidara | 354/317 |
| 4,741,621 A | 5/1988 | Taft et al. | 356/376 |
| 4,745,040 A | 5/1988 | Levine | 430/21 |
| 4,755,844 A | 7/1988 | Tsuchiya et al. | 354/317 |
| 4,777,102 A | 10/1988 | Levine | 430/21 |
| 4,796,061 A | 1/1989 | Ikeda et al. | 355/73 |
| 4,814,630 A | 3/1989 | Lim | 250/578 |
| 4,821,114 A | 4/1989 | Gebhardt | 358/75 |
| 4,845,551 A | 7/1989 | Matsumoto | 358/80 |
| 4,851,311 A | 7/1989 | Millis et al. | 430/30 |
| 4,857,430 A | 8/1989 | Millis et al. | 430/30 |
| 4,875,067 A | 10/1989 | Kanzaki et al. | 354/325 |
| 4,969,045 A | 11/1990 | Haruki et al. | 358/228 |
| 4,994,918 A | 2/1991 | Lingemann | 358/214 |
| 5,027,146 A | 6/1991 | Manico et al. | 354/299 |
| 5,034,767 A | 7/1991 | Netz et al. | 354/3 |
| 5,101,286 A | 3/1992 | Patton | 358/487 |
| 5,124,216 A | 6/1992 | Giapis et al. | 430/30 |
| 5,155,596 A | 10/1992 | Kurtz et al. | 358/214 |
| 5,196,285 A | 3/1993 | Thomson | 430/30 |
| 5,200,817 A | 4/1993 | Birnbaum | 358/80 |
| 5,212,512 A | 5/1993 | Shiota | 354/319 |
| 5,231,439 A | 7/1993 | Takahashi et al. | 354/313 |
| 5,235,352 A | 8/1993 | Pies et al. | 346/140 |
| 5,255,408 A | 10/1993 | Blackman | 15/308 |
| 5,264,924 A * | 11/1993 | Cok | 348/624 |
| 5,266,805 A | 11/1993 | Edgar | 250/330 |
| 5,267,030 A | 11/1993 | Giorgianni et al. | 358/527 |
| 5,292,605 A | 3/1994 | Thomson | 430/30 |
| 5,296,923 A | 3/1994 | Hung | 358/527 |
| 5,334,247 A | 8/1994 | Columbus et al. | 118/411 |
| 5,350,651 A | 9/1994 | Evans et al. | 430/21 |
| 5,350,664 A | 9/1994 | Simons | 430/362 |
| 5,357,307 A | 10/1994 | Glanville et al. | 354/324 |
| 5,360,701 A | 11/1994 | Elton et al. | 430/617 |
| 5,371,542 A | 12/1994 | Pauli et al. | 348/262 |
| 5,391,443 A | 2/1995 | Simons et al. | 430/21 |
| 5,414,779 A | 5/1995 | Mitch | 382/199 |
| 5,416,550 A | 5/1995 | Skye et al. | 354/298 |
| 5,418,119 A | 5/1995 | Simons | 430/507 |
| 5,418,597 A | 5/1995 | Lahcanski et al. | 355/76 |
| 5,432,579 A | 7/1995 | Tokuda | 354/293 |
| 5,436,738 A | 7/1995 | Manico | 358/503 |
| 5,440,365 A | 8/1995 | Gates et al. | 354/298 |
| 5,447,811 A | 9/1995 | Buhr et al. | 430/20 |
| 5,448,380 A | 9/1995 | Park | 358/520 |
| 5,452,018 A | 9/1995 | Capitant et al. | 348/651 |
| 5,465,155 A | 11/1995 | Edgar | 358/500 |
| 5,477,345 A | 12/1995 | Tse | 358/500 |
| 5,496,669 A | 3/1996 | Pforr et al. | 430/22 |
| 5,516,608 A | 5/1996 | Hobbs et al. | 430/30 |
| 5,519,510 A | 5/1996 | Edgar | 358/471 |
| 5,546,477 A | 8/1996 | Knowles et al. | 382/242 |
| 5,550,566 A | 8/1996 | Hodgson et al. | 345/202 |
| 5,552,904 A | 9/1996 | Ryoo et al. | 358/518 |
| 5,563,717 A | 10/1996 | Koeng et al. | 358/406 |
| 5,568,270 A | 10/1996 | Endo | 358/298 |
| 5,576,836 A | 11/1996 | Sano et al. | 358/302 |
| 5,581,376 A | 12/1996 | Harrington | 358/518 |
| 5,587,752 A | 12/1996 | Petruchik | 396/315 |
| 5,596,415 A | 1/1997 | Cosgrove et al. | 358/296 |
| 5,627,016 A | 5/1997 | Manico | 430/434 |
| 5,641,596 A * | 6/1997 | Gray et al. | 430/21 |
| 5,649,260 A | 7/1997 | Wheeler et al. | 396/569 |
| 5,664,253 A | 9/1997 | Meyers | 396/603 |
| 5,664,255 A | 9/1997 | Wen | 396/627 |
| 5,667,944 A | 9/1997 | Reem et al. | 430/359 |
| 5,678,116 A | 10/1997 | Sugimoto et al. | 396/611 |
| 5,691,118 A | 11/1997 | Haye | 430/357 |
| 5,695,914 A | 12/1997 | Simon et al. | 430/379 |
| 5,698,382 A | 12/1997 | Nakahanada et al. | 430/418 |
| 5,726,773 A | 3/1998 | Mehlo et al. | 358/474 |
| 5,739,897 A | 4/1998 | Frick et al. | 355/40 |
| 5,771,107 A | 6/1998 | Fujimoto et al. | 358/464 |
| 5,790,277 A | 8/1998 | Edgar | 358/487 |
| 5,835,795 A | 11/1998 | Craig et al. | 396/6 |
| 5,835,811 A | 11/1998 | Tsumura | 396/598 |
| 5,870,172 A | 2/1999 | Blume | 355/27 |
| 5,880,819 A | 3/1999 | Tanaka et al. | 355/75 |
| 5,892,595 A | 4/1999 | Yamakawa et al. | 358/530 |
| 5,930,388 A | 7/1999 | Murakami et al. | 382/167 |
| 5,959,720 A | 9/1999 | Kwon et al. | 355/38 |
| 5,963,662 A | 10/1999 | Vachtsevanos et al. | 382/150 |
| 5,966,465 A | 10/1999 | Keith et al. | 382/232 |
| 5,979,011 A | 11/1999 | Miyawaki et al. | 15/308 |
| 5,982,936 A | 11/1999 | Tucker et al. | 382/233 |
| 5,982,937 A | 11/1999 | Accad | 382/239 |
| 5,982,941 A | 11/1999 | Loveridge et al. | 382/260 |
| 5,982,951 A | 11/1999 | Katayama et al. | 382/284 |
| 5,988,896 A | 11/1999 | Edgar | 396/604 |
| 5,991,444 A | 11/1999 | Burt et al. | 382/232 |
| 5,998,109 A | 12/1999 | Hirabayashi | 430/434 |
| 6,000,284 A | 12/1999 | Shin et al. | 73/150 |
| 6,005,987 A | 12/1999 | Nakamura et al. | 382/294 |
| 6,065,824 A | 5/2000 | Bullock et al. | 347/19 |
| 6,069,714 A | 5/2000 | Edgar | 358/487 |
| 6,088,084 A | 7/2000 | Nishio | 355/75 |
| 6,089,687 A | 7/2000 | Helterline | 347/7 |
| 6,101,273 A | 8/2000 | Matama | 382/169 |
| 6,102,508 A | 8/2000 | Cowger | 347/7 |
| 6,137,965 A | 10/2000 | Burgeios et al. | 396/626 |
| 6,200,738 B1 | 3/2001 | Takano et al. | 430/362 |

FOREIGN PATENT DOCUMENTS

| | | |
|---|---|---|
| EP | 0 422 220 A1 | 3/1989 |
| EP | 0 482 790 B1 | 9/1991 |
| EP | 0 525 886 A3 | 7/1992 |
| EP | 0 580 293 A1 | 6/1993 |
| EP | 0 580 293 A1 | 1/1994 |
| EP | 0 601 364 A1 | 6/1994 |
| EP | 0 669 753 A2 | 2/1995 |
| EP | 0 794 454 A2 | 2/1997 |
| EP | 0 768 571 A2 | 4/1997 |
| EP | 0 806 861 A1 | 11/1997 |
| EP | 0 878 777 A2 | 11/1998 |
| EP | 0 930 498 A2 | 12/1998 |
| WO | WO 90/01240 | 2/1990 |
| WO | WO 91/09493 | 6/1991 |
| WO | WO 97/25652 | 7/1997 |
| WO | WO 98/19216 | 5/1998 |
| WO | WO 98/25399 | 6/1998 |
| WO | WO 98/31142 | 7/1998 |

| WO | WO 98/34157 | 8/1998 |
| WO | WO 98/34397 | 8/1998 |
| WO | WO 99/43148 | 8/1999 |
| WO | WO 99/43149 | 8/1999 |
| WO | WO 01/01197 | 1/2001 |
| WO | WO 01/13174 A1 | 2/2001 |
| WO | WO 01/45042 A1 | 6/2001 |
| WO | WO 01/50192 A1 | 7/2001 |
| WO | WO 01/50193 A1 | 7/2001 |
| WO | WO 01/50194 A1 | 7/2001 |
| WO | WO 01/50197 A1 | 7/2001 |
| WO | WO 01/52556 A2 | 7/2001 |

OTHER PUBLICATIONS

"*Adaptive Fourier Threshold Filtering: A Method to Reduce Noise and Incoherent Artifacts in High Resolution Cardiac Images*", Doyle, M., et al., 8306 Magnetic Resonance in Medicine 31, No. 5, Baltimore, MD, May, pp. 546-550, 1994.

"*Anisotropic Spectral Magnitude Estimation Filters for Noise Reduction and Image Enhancement*", Aich, T., et al., Philips GmbH Research Laboratories, IEEE, pp. 335-338, 1996.

"*Adaptive-neighborhood filtering of images corrupted by signal-dependent noise*", Rangayyan, R., et al., Applied Optics, vol. 37, No. 20, pp. 4477-4487, Jul. 10, 1998.

"*Grayscale Characteristics*", The Nature of Color Images, Photographic Negatives, pp. 163-168.

"*Parallel Production of Oligonucleotide Arrays Using Membranes and Reagent Jet Printing*", Stimpson, D., et al., Research Reports, BioTechniques, vol. 25, No. 5, pp. 886-890, 1998.

"*Low-Cost Display Assembly and Interconnect Using Ink-Jet Printing Technology*", Hayes, D. et al., Display Works '99, MicroFab Technologies, Inc., pp. 1-4, 1999.

"*Ink-Jet Based Fluid Microdispensing in Biochemical Applications*", Wallace, D., MicroFab Technologies, Inc., Laboratory Automation News, vol. 1, No. 5, pp. 6-9, Nov., 1996.

"*Protorealistic Ink-Jet Printing Through Dynamic Spot Size Control*", Wallace, D., Journal of Imaging Science and Technology, vol. 40, No. 5, pp. 390-395, Sep./Oct. 1996.

"*MicroJet Printing of Solder and Polymers for Multi-Chip Modules and Chip-Scale Package*", Hayes, D., et al., MicroFab Technologies, Inc.

"*A Method of Characterisstics Model of a Drop-on-Demand Ink-Jet Device Using an Integral Method Drop Formation Model*", Wallace, D., MicroFab Technologies, Inc., The American Society of Mechanical Engineers, Winter Annual Meeting, pp. 1-9, Dec. 10-15, 1989.

"*Digital Imaging Equipment White Papers*", Putting Damaged Film on ICE, www.nikonusa.com/reference/whitepapers/imaging, Nikon Corporation, Nov. 28, 2000.

* cited by examiner

MATCH BLUR SYSTEM AND METHOD

CROSS-REFERENCE TO RELATED APPLICATIONS

This application is related to U.S. Provisional Patent Application No. 60/180,036, entitled "Match Blur System and Method, filed on Feb. 3, 2000. This application is related to U.S. Provisional Patent Application Nos. 60/180,035, entitled "Digital Imaging With Sheep and Shepherd Artifacts" filed on Feb. 3, 2000; 60/180,030, entitled "Reducing Streaks in Scanning" filed on Feb. 3, 2000; and 60/180,031, entitled "Pyramiding and Digital Imaging System and Method" filed on Feb. 3, 2000, each of the same inventor hereof, and filed concurrently herewith, and those respective applications are incorporated herein. This application is also related to U.S. patent application Ser. No. 09/255,401, entitled "Parametric Image Stitching", filed on Feb. 22, 1999, and Ser. No. 09/247,264, entitled "Image Block Windowed Blending", filed on Feb. 10, 1999, each of the same inventor hereof and incorporated herein. This application is also related to U.S. Provisional Patent Application No. 60/180,028, entitled "Method to Remove Magenta Stain From Digital Images" filed on Feb. 3, 2000, assigned to the same assignee hereof, filed concurrently herewith, and incorporated herein.

FIELD OF THE INVENTION

The invention generally relates to signal processing and, more particularly, to improving results from blur operations with digital artifacts of an analog signal, by guiding noisy artifacts by less noisy artifacts and clamping overly emphasized properties, for example, in digital film processing.

BACKGROUND OF THE INVENTION

In blurring operations, digital separations or channels (also referred to herein as "artifacts") of analog signals, such as digital artifacts respectively exhibiting various characteristics or properties of an analog image, are refined or enhanced by averaging over a spatial area each point (e.g., pixel) of the digital result. For each pixel represented in a digitized image or artifact, for instance, the particular pixel is averaged with a surrounding region of adjacent pixels to obtain a new value for the particular pixel. When such blurring is performed for all points in a digital artifact, the intended result is a more expressive and refined digitization.

Blurring can sometimes distort, however, rather than improve the digital result. In digitization of an image, a resulting digital image can be further distorted, rather than enhanced, in certain spatial locations of the image, for example, blurring near edge lines or borders can yield unintended results from the averaging operation. This is because each pixel is replaced with an average for an area surrounding the pixel, and dramatically varying features within the area can skew the average. Additional techniques are required to correct the unintended results.

Certain blurring operations, particularly in digital imaging, can cause mottle effects, such as magenta mottle. Mottle refers to spotting or blotching. In digitization of images, such as in digital film processing, various factors can affect mottle in the result. The tone magenta in images from digital film processing is particularly problematic in mottle effects.

It would be an advantage and improvement in the art and technology to provide systems and methods for performing blurring of digital images that reduces chances of unintended results in spatial vicinities of significant features and also in mottle effects.

SUMMARY OF THE INVENTION

An embodiment of the invention is a method of blurring a digital image. The method includes separating the image into noisy artifacts and less noisy artifacts, averaging the less noisy artifacts over a spatial range for each pixel of the image, and guiding the noisy artifacts by the less noisy artifacts in the step of averaging.

Another embodiment of the invention is a method of blurring. The method includes deriving a noisy artifact, selecting a less noisy artifact, subdividing the noisy artifact into a plurality of windows, subdividing each of the plurality of windows into a plurality of squares, subdividing the less noisy artifact into a plurality of windows corresponding to the plurality of windows of the noisy artifact, subdividing each of the plurality of windows of the less noisy artifact into a plurality of squares corresponding to the plurality of squares of the noisy artifact, determining a difference between a square at a centrum of a window of the less noisy artifact and another square within the window of the less noisy artifact, weighting a value for the square based on the difference, summing all of the values for the square as so weighted, multiplying a value for the square of the window of the noisy artifact by the result of the step of summing, summing all of the results of the step of multiplying for each square of the window of the noisy artifact, and dividing the result of the step of summing all of the results, by the result of the step of summing all of the values for the square.

Yet another embodiment of the invention is a method of blurring. The method includes guiding a noisy artifact by a less noisy artifact.

Another embodiment of the invention is a method of blurring. The method includes weighting a value in a blur region.

Another embodiment of the invention is a method of signal processing. The method includes deriving a noisy artifact and a less noisy artifact from an analog signal and guiding the noisy artifact by the less noisy artifact.

Yet another embodiment of the invention is a system for blurring. The system includes a noisy artifact, a less noisy artifact, wherein spatial locations of the less noisy artifact corresponds to locations of the noisy artifact, and a computer for guiding the noisy artifact by the less noisy artifact.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

When analog signals are scanned or otherwise separated or channeled into digital data sets (herein referred to as "artifacts"), the resulting artifacts will, to varying degree, inexactly model the continuous analog signals, because of the discrete nature of digital signals. For example, digital images derived from analog images can exhibit differences of distortion or noise that limits quality of color, lines, structure and other feature or property expression. An operation to enhance digital signals, such as a digital image, derived from analog signals, such as an exposed photographic film, is referred to as "blurring". In blurring operations, for example, with a digital file of an image, the digital image is blurred by independently averaging all pixels within a region surrounding each pixel of the image, and replacing each pixel with the averaged result for the pixel.

Transition effects, such as edge lines in an image, can cause blurring procedures to undesirably distort the averaged result for the regions of pixels at the transitions. Also, certain properties, such as the color magenta, can be expressed more significantly than desired in the resulting digital product as mottle. These problems and others can be reduced by employing a relatively less noisy digital artifact (shepherd artifact), in comparison to other noisy digital artifacts (sheep artifacts), to guide a blurring operation. Additionally, special techniques of clamping the expression of a certain property exhibited by the artifacts, such as the color magenta, can reduce the undesired over-expression of the property, for example, as mottle, in the result from the blur.

Figure 1:
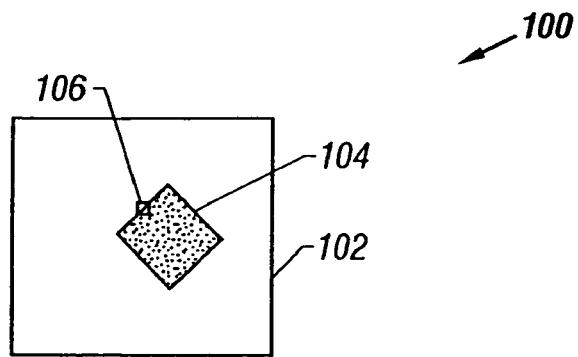
FIG. 1 is an illustration of an exemplary image, such as can be imprinted in a photographic film, illustrating spatial relationships of portions thereof, according to embodiments of the present invention.

Referring to FIG. 1, an analog signal is illustrated as an image 100 imprinted in a photographic film 102. The image 100 depicts a diamond shape 104 in a centralized portion of the film 102. A window 106 is shown at an edge of the shape 104 of the image 100. The window 106 is not actually exhibited in the image 100, but is intended merely to illustrate a single, spatial location of the image 106 (for example, a point located at a center of the window 106) and a defined area adjacent that location (in this case, exemplified by the square shape of the window 106). Although the window 106 is square, that shape is intended merely as exemplary, as the window 106 could be any other desired shape.

Figure 2:
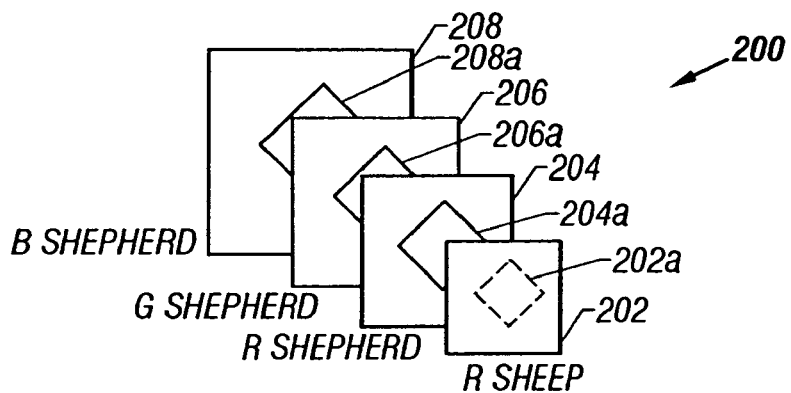
FIG. 2 is an illustration of digital artifacts derived from a separation process with an image, wherein noisy (sheep) artifacts and less noisy (shepherd) artifacts result, according to embodiments of the present invention.

Referring to FIG. 2, scanning and other digitization of analog signals, such as images, can provide separations of various properties of the signals that are exhibited by digital data sets (or artifacts), for example, artifacts of a scanned image. As described in the related applications and patents, pluralities of artifacts can be segregated into noisy (sheep) artifacts and less noisy (shepherd) artifacts for various properties of interest of the analog signal. These sheep and shepherd artifacts can be obtained and derived from scanning or other operations. In the particular application of digital photographic film processing, a scanner scans a photographic film at instances during the film development process. The scan yields scanned results that provide grainy and luminous noisy (sheep) channels, such as a red, green and blue channel at various instances in time during film development, and also can provide channels that are highly definite in exhibiting detail and edges, such as a relatively noiseless (shepherd) channel for each of those colors at certain instances in time. The digital artifacts can be manipulated, for example, the sheep artifacts can be averaged and a best one of the shepherd artifacts can be selected, so that the shepherd artifacts can guide the sheep artifacts in order to produce an improved resulting digitized image.

In an exemplary three-color (e.g., red, green and blue) system in digital imaging, a representative sheep artifact 202 is derived, such as a red sheep artifact which is an average of artifacts exhibiting the color red. The particular representative sheep artifact 202, in any instance, can be derived as an average, some weighted or proportional sum, or some other selection of, from, or among multiple artifacts. The representative sheep artifact 202, for example, has corresponding shepherd artifacts 204, 206, 208, such as a red shepherd, a green shepherd, and a blue shepherd artifact, in the case of the three-color system and the exemplary red sheep artifact. Each of the colors of the system, such as green and blue in addition to red, will also have a particular representative sheep artifact 202 and several shepherd artifacts 202, 205, 208 for all colors that are associated with the color. As described in the related applications, each of the shepherd artifacts is developed to guide the sheep artifacts to yield desired results. The same beneficial effects of guiding noisy channels (sheep artifacts) by less noisy channels (shepherd artifacts) can be employed to reduce undesired blurring results, such as skewed averages in a vicinity of strong features, and to suppress noise in the image 104, such as mottle of magenta or other color, as later described herein.

Figure 3:
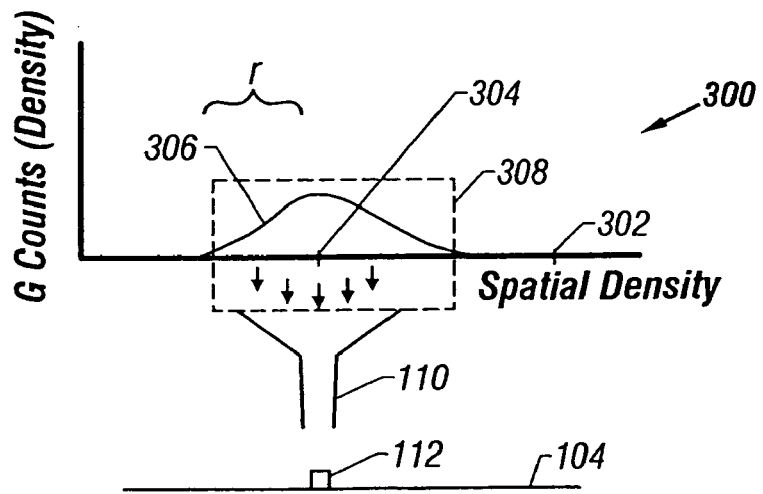
FIG. 3 is a side-view of an image, like that of FIG. 1, illustrating a superimposed density curve and blur plot about a point (i.e., pixel) and illustrating a blurring to obtain a single averaged value for the pixel, according to embodiments of the present invention.

Referring to FIG. 3, a blurring operation 300 is explained through illustration. In the operation 300, an image 302 is subjected to blurring. In the blurring operation 300, each pixel, such as a pixel 304, of the image 302, is averaged over a region surrounding the pixel 304 to obtain a new value for the pixel 304. The average is indicated by the curve 306.

A square window 308 superimposed over the image 302 in the Figure is illustrative of the averaging operation for the pixel 304. As shown in the illustration of the window 308, a new value for the pixel 304 is obtained as an average, for example, a weighted average determined from calculations involving the pixel 304 and surrounding pixels within the square 308. The window 308, in an 8-bit imaging instance, is 8-bit by 8-bit in area. For the single pixel 304, therefore, a blurring operation can involve numerous calculations, on the order of 64 or more. Of course, the entire image 302 can be composed of a significant number of pixels, substantially increasing the number of calculations necessary to perform blurring of the entire image 302. New values are determined for each pixel of the image, in the same manners as for the pixel 304, and each such pixel of the image 302 requires the numerous calculations as for the single pixel 304.

Figure 4:
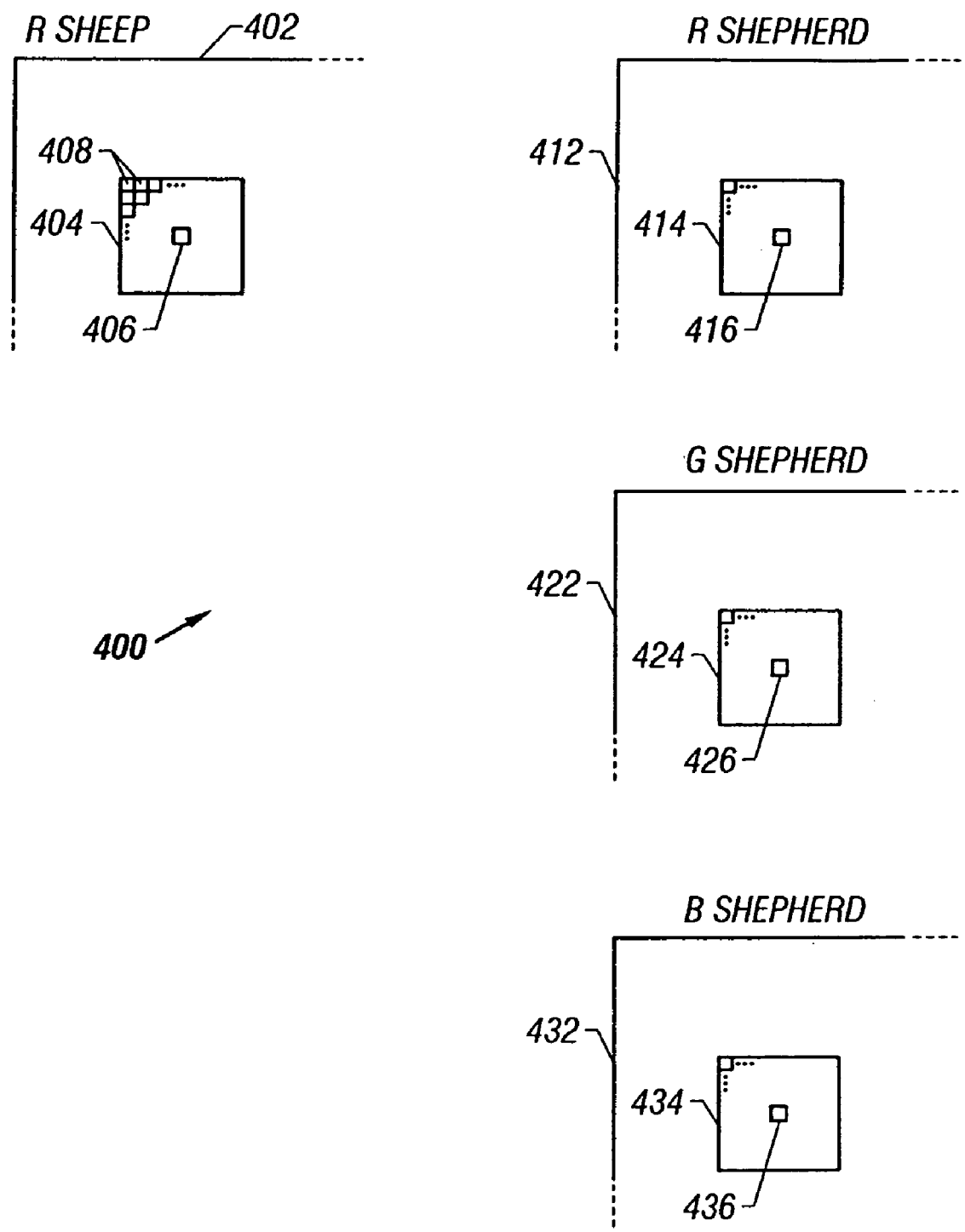
FIG. 4 illustrates a noisy artifact and three less noisy artifacts and locates corresponding points of each such artifact that are correlated in a blur method, according to embodiments of the present invention.

Referring to FIG. 4, several artifacts 400 are employed in the blurring operation 300 of FIG. 3 according to embodiments of the present invention. In FIG. 4, a representative sheep artifact 402, like the sheep artifact 202 of FIG. 2 for the color red, is illustrated in an enlarged and partial view format. The sheep artifact 402 includes a window 404 superimposed on the artifact 402 at a particular spatial location. Shepherd artifacts 412, 422, 432 corresponding to the sheep artifact 402 are also illustrated in similar enlarged and partial format. Windows 414, 424, 434 are each spatially located in the respective shepherd artifacts 412, 422, 432 at the particular location of the shepherd corresponding to the particular location of the sheep.

Each window 404, 414, 424, 434 has at its centrum a corresponding index 406, 416, 426, 436, respectively. Each window 404, 414, 424, 434 is for purposes of performing calculations, sub-divided into a number of small squares or other shapes (e.g., squares 408) of spatial area within the respective window 404, 414, 424, 434, for example, 64 squares. The index 406, 416, 426, 436 identifies the particular window, 404, 414, 424, 434, and also identifies the small squares (e.g., square 408) of spatial area within the window 404 that is the centrum. Each artifact 402, 412, 422, 432 is similarly divided into the respective windows over the entire area of the artifact 402, 412, 422, 432, and each window over the entire area of the respective artifact 402, 412, 422, 432 is similarly divided into the respective squares over the entire area of the respective window. It is notable that there are corresponding windows and squares within the windows as to spatial location, for each of the artifacts 402, 412, 422, 432. The plurality of artifacts, windows over the area of the artifacts, and squares over the area of each window are used in performing a blur hereinafter described.

Figure 5:
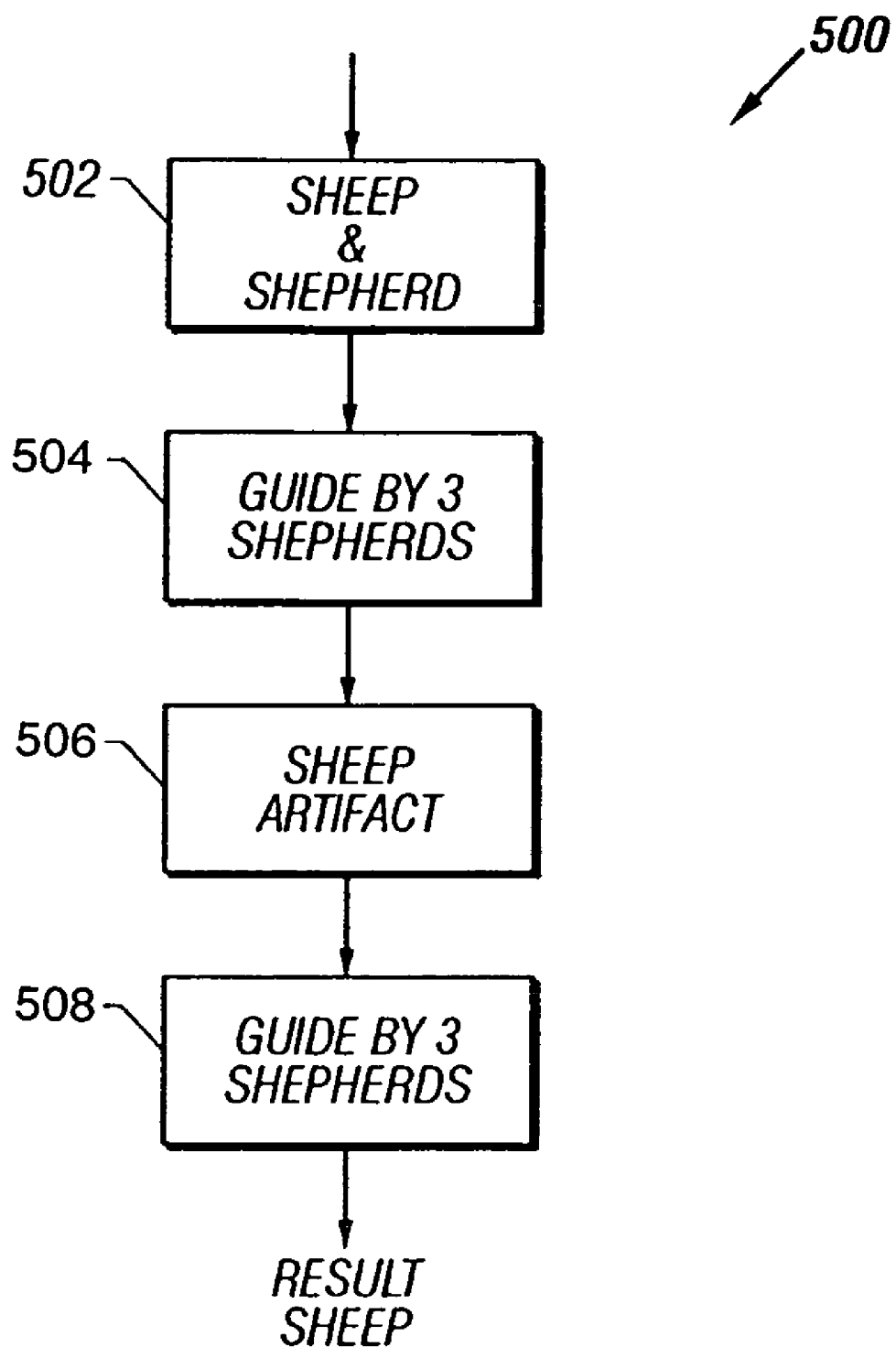
FIG. 5 is a flow diagram of a method of blurring, according to embodiments of the present invention.

Referring to FIG. 5, a method 500 performs a match blur. The term "match blur", as used herein, refers to a guiding of the blurring calculations for any given pixel by the method 500. In a step 502 of the method 500, sheep and shepherd artifacts of an image are derived. The derivation of sheep and shepherd artifacts in the step 502 is further detailed in the related applications and patents. In general, sheep artifacts exhibit significant noise and color, whereas the shepherd artifacts are relatively noiseless and exhibit primarily lines and edges. A representative sheep artifact is selected from a plurality of sheep artifacts, for example, by an averaging calculation for the plurality or by some other selection process.

In a step 504, one or more shepherd artifacts from the step 502 are used to guide the blur region for each particular location, e.g., each square of each window, of a representative sheep artifact. The blur region, as so defined, corresponds (for example purposes) to the square 106 of FIG. 1, shown in respective sheep and shepherd artifacts 202, 204, 206, 208 in FIG. 2 as squares 202a, 204a, 206a, 208a, and respective sheep and shepherd artifacts 402, 412, 422, 432 in FIG. 4 as squares 404, 414, 424, 434. In general, the shepherd artifacts serve to indicate edges in the vicinity of the particular window and the blurring for the window is limited where such transitions are dictated by the shepherd artifacts. By so guiding the blur with the shepherd artifacts, the problems of skewed averages in blur calculations are reduced in areas in the vicinity of transitions such as edge lines.

In a step 506, a first averaging of values for each window having an index and respective squares is accomplished through shepherd guide of sheep and yields a refined sheep artifact. In a step 508, the refined sheep artifact is again guided by the shepherd artifacts in a second averaging operation. From the guiding step 508, a resulting sheep artifact is obtained. The method 500 is performed for each of the respective sheep artifacts of an image. The several resulting sheep artifacts from the method 500 can then be recombined, for example, according to the procedures of the related patents and applications.

Figure 6:
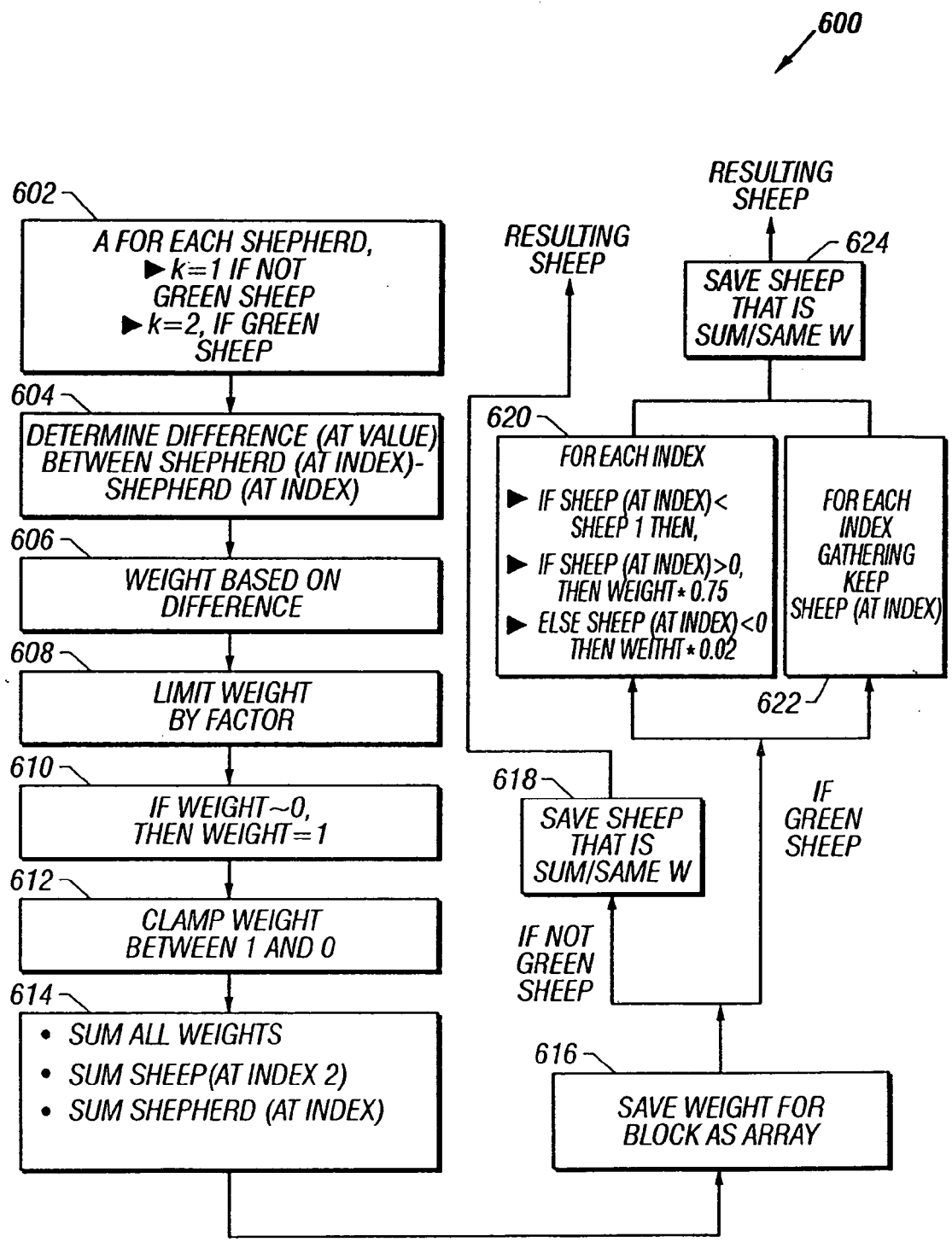
FIG. 6 is a more detailed flow diagram of an embodiment of the method of the flow diagram of FIG. 5, and illustrating a method to de-emphasize a particular property of magenta mottle exhibited by certain artifacts employed in the blur, according to embodiments of the present invention.

Referring to FIG. 6, a method 600 details each of the guiding steps 504, 508 of the method 500 of FIG. 5. The method 600 is performed at each of the steps 504, 508 for each of the representative sheep artifacts. In a step 602 of the method 600, an initialization of a value "k" is performed for each shepherd artifact. If the representative sheep artifact is not representative of a property, for example, the color green, that tends to be over-expressed in blur results, such as magenta mottle, then k=1 for each shepherd artifact. Otherwise, k=2 for each shepherd artifact. The variable "k" is employed in later steps of the method 600 as a weighting factor.

In a step 604, an absolute value of a difference determination between a value of the center square (i.e., index) of a window of the shepherd artifact and another square of the window is determined for each square of each window, whereby such difference determinations of each window represents a sequence of difference determinations for that particular window. In a step 606, the absolute value of each difference from the sequence of difference determinations of each window is then weighted by multiplying the absolute value of each difference from the sequence of difference determinations of each window (i.e. each absolute difference value) by the weighting factor "k" from the step 602, thereby producing a weighted difference value corresponding to each absolute difference value. The absolute value determination and weighting is performed over the entirety of each shepherd artifact, that is, square-by-square, through window-by-window, over the entire artifact.

Each weighted difference value from the step 606 is then limited by the product of one over a threshold factor. The threshold factor is determined empirically and can vary for the particular application and desired result. In every event, the threshold factor is chosen to yield a value (i.e., the original product referred to below) between one and zero when each weighted difference value is multiplied by one over the threshold factor.

In a step 610, a new value of either zero or one is derived for each weighted difference value by setting the new value at 0.0 when the original product of the weighted difference value times one over threshold factor is greater than one and at 1.0 when the original product of the weighted difference value times one over threshold factor is less than one. This clamps each weighted difference value to one or zero, as illustrated by a step 612, thereby producing clamped weighted difference values.

The clamped weighted difference values, after clamping in step 612, are summed in a step 614. For the representative sheep artifact, the squares of the sheep artifact at the corresponding locations are also summed. A product sum is calculated for each square of the shepherd artifact, which product is sum of all squares the sheep artifact multiplied times the clamped and summed weight for a particular square of the shepherd artifact. The clamped weight values from the step 612 are saved in a step 616 for each square of the shepherd artifact, such as in an array. The saved clamped weight difference values from the step 616 are later used only in the event of performing the method 600 with the sheep artifact that would otherwise be overly expressed in the result, such as the green sheep artifact that leads to magenta mottle if the method 600 is not followed in the blur.

In effect, the weighting and clamping of the foregoing steps of the method 600 serves to cause the weight for each window saved in the step 616, to approach the value of either 0 or 1 for the window. Because the weight is either 0 or 1, the sum of the weights for each square will only become large if the absolute value of the difference of the respective squares of the shepherd artifacts approach the value zero. That is, the sum of the weights is large only if the shepherd artifacts agree at the particular square of the shepherd artifact and, thus, at the particular window. If a feature exists in one shepherd artifact, but not another shepherd artifact for the calculation, then the feature will be less emphasized in the resulting blur from the method 600 than will other feathers appearing strongly in both shepherd artifacts. This is the effect of the method 600, as just described, for all sheep artifacts; provided any sheep artifact, such as the green sheep artifact of an image, that tends to be overly expressed in the result, for example, as magenta mottle in the case of the green sheep artifact, is further manipulated to limit the expression, as now described.

If the sheep artifact in the method 600 is not one that tends to be overly expressed in the result, for example, it is not the green sheep artifact in imaging, then a new value is set and saved in step 618 for each window of the sheep artifact, which new value is calculated as the product sum of all squares for the sheep artifact times the clamped and summed weight for the square from the step 614 divided by the clamped and summed weight from the step 614.

If, on the other hand, the sheep artifact in the method 600 is one that tends to be overly expressed, such as the green sheep artifact, then the method 600 proceeds to a step 620 or 622. For each square of each window of the sheep artifact, if the value for a particular square is less than the value at the centrum of the square of the sheep artifact, then the step 620 is performed. Otherwise, the step 622 is performed. In the step 620, if the value for a particular square of the sheep artifact is greater than zero, then the weight for the square is multiplied by a factor, such as 0.75. If the value for the particular square is less than zero, then the weight for the particular square is multiplied by another factor, for example, 0.20. The factor is empirically determined for the application. In a step 624, the weight as multiplied by the applicable factor from the step 620 is employed to derive a new value which is set and saved in the step 624 for each window of the sheep artifact. The new value, in this instance, is calculated as the product sum of all squares for the sheep artifact times the weight multiplied by the applicable factor from the step 620, divided by the weight multiplied by such applicable factor from the step 620.

If the step 622 is performed, rather than the step 620, then the step 624 proceeds in the same manner as the step 618. That is, the new value is calculated as the sum of all squares for the sheep artifact multiplied by the weight and divided by the sum of the weight.

Example code for performing the method 600 of FIG. 6 is attached and incorporated herein.

Figure 7:
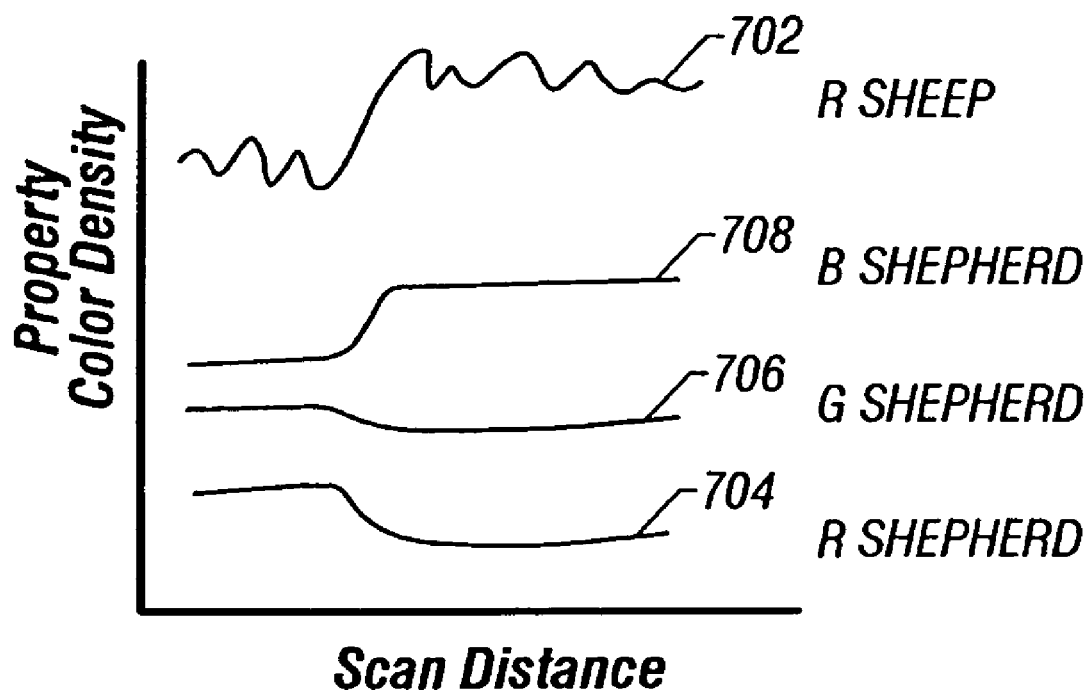
FIG. 7 is a graph showing an example comparison of effects in artifacts exhibiting the particular property for de-emphasis in the method of FIG. 6, according to embodiments of the present invention.

Referring to FIG. 7, the guiding of a sheep artifact 202, such as the red sheep artifact of FIG. 2, by one or more shepherd artifacts 204, 206, 208, such as the red, green, and blue shepherd artifacts of FIG. 2, can be understood with reference to some exemplary curve plots. The plots include a sheep artifact curve 702 and three shepherd artifact curves 704, 706, and 708. For purposes of example, the sheep curve 702 corresponds to a representative sheep artifact 202, such as a red sheep artifact. The shepherd artifact curves 704, 706, and 708 correspond to the shepherd artifacts 204, 206, 208, such as the red, green shepherd, and blue shepherd artifacts, respectively. As discussed in the related patents and applications, the shepherd artifacts 204, 206, and 208 exhibit very little noise and are highly indicative of transitions, such as edge lines. The sheep artifact 202, such as the red sheep artifact, is primarily color and is very noisy. In FIG. 3, scanning distance for a particular point, such as that corresponding to the point of the pixel 304 of the image 302, is plotted against color density detected by the scanner. From the plot, it is apparent that the shepherd curves 704, 706, and 708 indicate clear transitions at a certain point "x" along the scan distance axis. This is indicative of a transition, such as an edge line, in the original image.

The sheep curve 702, on the other hand, is a very irregular curve. Although the transition at "x" appears in the curve 702, the irregularity of the curve 702 does not so clearly locate the transition. In accordance with the embodiments described herein, one or more of the shepherds artifacts 204, 206, or 208, as depicted by the curves 704, 706, and 708, are employed to guide the sheep artifact 702, as indicated by the curve 702. By guiding the sheep artifact 702 with one or more of the shepherd artifacts 204, 206, and 208, the color of the sheep artifact 702 can be located more precisely in the digitized image because of the strong transition identification by the shepherd artifacts 204, 206, and 208.

Figure 8:
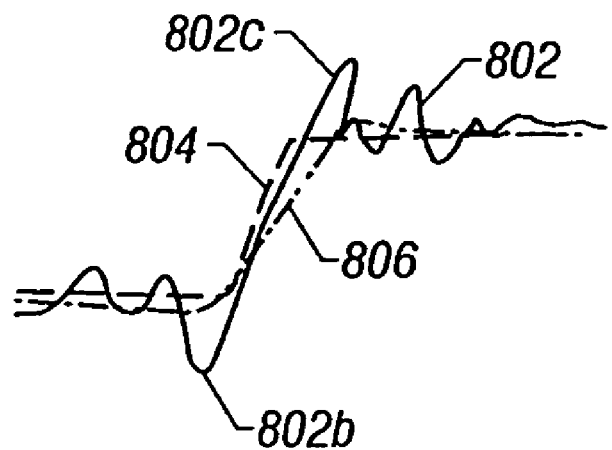
FIG. 8 is a graph illustrating sheep and shepherd artifact guiding effects and clamping in order to de-emphasize the particular property in the method of FIG. 6, according to embodiments of the present invention.

Referring to FIG. 8, treatment of a sheep artifact 202 that tends to be overly expressed in a result, such as the effect of magenta mottle from the green sheep artifact in imaging, is manipulated by a special technique that was described above. The effect of the special technique can be understood by the overlapping curves of FIG. 8. A curve 802 is an exemplary color density plot from scanning of the green sheep artifact. A curve 806 is a similar curve for a shepherd artifact that can guide the sheep artifact in the method 600. Because the method 600 offsets weighting in squares of the green sheep artifact, according to the steps 620 or 622 in the method 600, upper 802a and lower 802b extremes of the green sheep artifact 802 are limited, so that the resulting green sheep artifact from the method 600 is more akin to the curve 804. It is notable that the curve 804 does not exhibit the upper 802a and lower 802b extremes of the green sheep artifact before offsetting of weighting. This limitation, or clamping, of extremes reduces the extent of mottle, such as magenta mottle from the green sheep artifact.

The foregoing description describes certain embodiments that are particularly applicable in digital film processing and other digital imaging operations. The same concepts are useful, however, in other contexts as well. In fact, the concepts can be applied generally to digital signal processing applications, in particular, in instances of a plurality of artifacts exhibiting various properties of the analog signal, some more prevalently than others. In such instances, blurring steps can be guided by using shepherd and sheep artifacts. Furthermore, properties that tend to be overly expressed in a result can be reduced in effect by weighting and weight offsetting in a sheep artifact exhibiting the particular property.

In the foregoing specification, certain specific embodiments have been described. Those of ordinary skill in the art will appreciate that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A subroutine in a method of blurring, said subroutine comprising the steps of:

deriving a noisy artifact exhibiting a color green;
   selecting a less noisy artifact exhibiting a color green;
   subdividing the noisy artifact into a plurality of windows;
   subdividing each of the plurality of windows into a plurality of squares;
   subdividing the less noisy artifact into a plurality of windows corresponding to the plurality of windows of the noisy artifact;
   subdividing each of the plurality of windows of the less noisy artifact into a plurality of squares corresponding to the plurality of squares of the noisy artifact;
   determining a difference between a square at a centrum of a window of the less noisy artifact and all of the other squares within the window of the less noisy artifact;
   weighting the difference between a square at a centrum of a window of the less noisy artifact and said other squares by multiplying the difference by a multiplying factor;
   varying the step of weighting by (a) 75% for the square of the window of the noisy artifact which is less than the square at the centrum of the window of the noisy artifact and (b) 25% for each square of the window of the noisy artifact which is not less than the square at the centrum of the window of the noisy artifact;
   summing all of the values for said other squares as so weighted;
   multiplying a value for each one of said other squares of the window of the noisy artifact by results of the step of summing;
   summing said results of the step of multiplying for each of said other squares of the window of the noisy artifact; and
   dividing said results of the step of summing said results, by the result of the step of summing all of the values for said other squares.

2. The subroutine of claim 1, further comprising the step of:

clamping the weighting step between minimum and maximum extremes, if the noisy artifact tends to be overly expressed in a result.

3. The subroutine of claim 1, further comprising the step of:

clamping the step of weighting so that the weight for the value is in the range of 0 to 1.

* * * * *